United States Patent Office
3,241,927
Patented Mar. 22, 1966

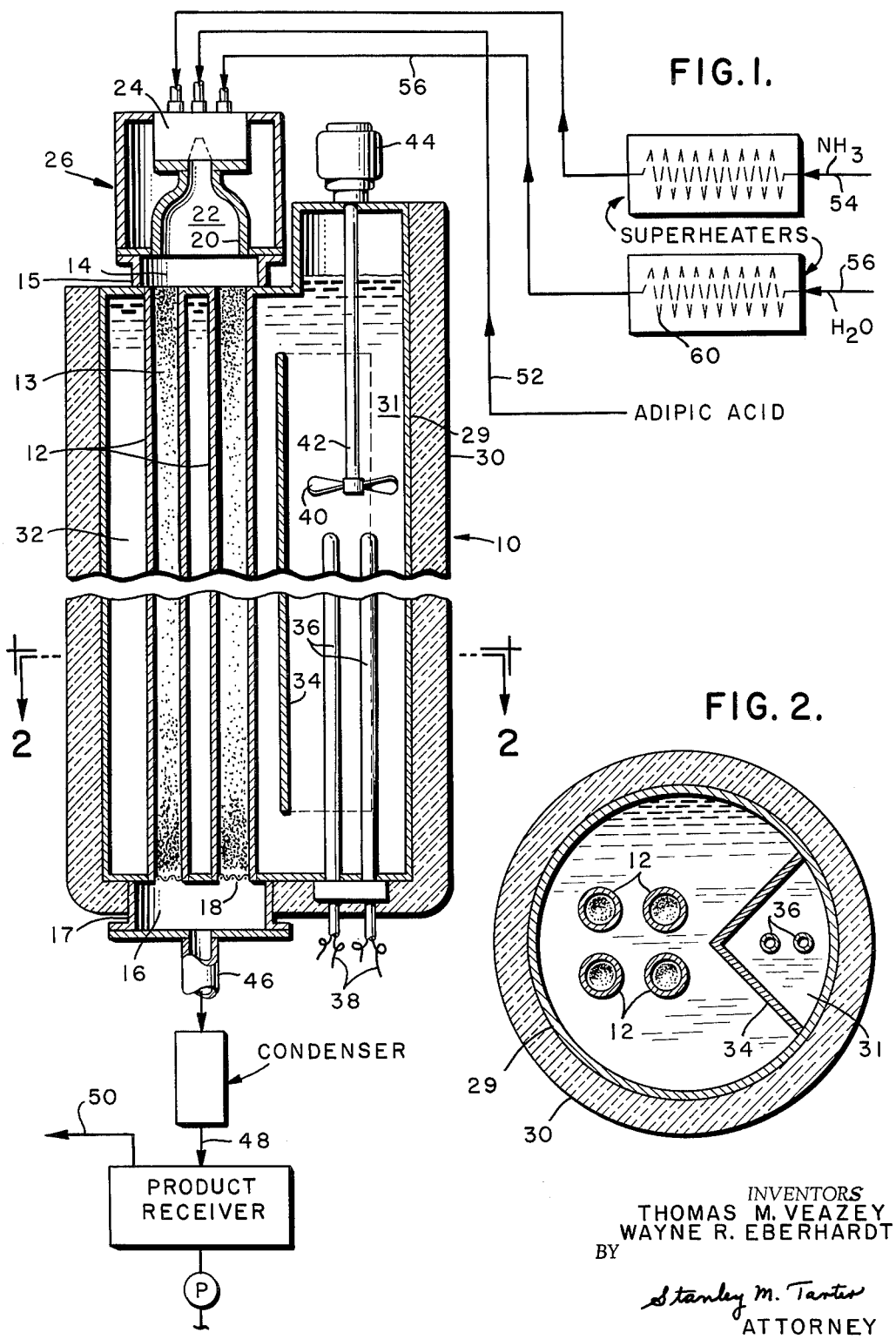

3,241,927
APPARATUS FOR ADIPONITRILE PRODUCTION
Wayne R. Eberhardt and Thomas M. Veazey, Decatur, Ala., assignors, by mesne assignments, to Monsanto Company, a corporation of Delaware
Original application Sept. 8, 1960, Ser. No. 54,783, now Patent No. 3,153,084, dated Oct. 13, 1964. Divided and this application Feb. 28, 1963, Ser. No. 261,810
11 Claims. (Cl. 23—288)

This application is a divisional application of application Serial No. 54,783, filed September 8, 1960, now U.S. Patent 3,153,084.

The present invention relates to a process and apparatus for the production of adiponitrile. More particularly the invention relates to a process and apparatus wherein molten adipic acid is vaporized in contact with superheated ammonia gas and continuously passed directly over a dehydrating catalyst for the production of adiponitrile.

The production of adiponitrile from adipic acid has assumed importance as a valuable intermediate from which hexamethylene diamine can be prepared, the said diamine and the adipic acid forming the basic substances employed in the production of nylon-66 which chemically is polymeric hexamethylene adipamide. For obvious reasons the hexamethylene diamine is the more expensive component used in the preparation of nylon-66. Hence, it is desirable to reduce the cost of the diamine as much as possible. One significant factor in the expense of producing hexamethylene diamine is the cost of purifying the relatively poor grade of adiponitrile which one obtains by the known process and apparatus. That is, to say, the adiponitrile obtainable according to prior art processes must be subjected to expensive purification procedures prior to its hydrogenation to produce hexamethylene diamine. Prior manufacturing methods and apparatus have involved spraying molten adipic acid into a rather large chamber having a wall maintained at a temperature above the boiling point of the acid. The sprayed droplets of adipic acid are brought into contact with the heated wall. Desirably, the contact of the adipic acid with the heated surface induces instant vaporization of the adipic acid. A carrier gas of superheated ammonia sweeps the vaporized adipic acid out of the chamber and through heated conduits to a chamber containing a dehydrating catalyst wherein the acid and ammonia react to form adiponitrile.

A major problem encountered in the manufacture of adiponitrile employing the known methods and apparatus described above has been the rather extensive degradation of adipic acid into decomposition products such ac cyclopentanone. In addition side reactions occur, resulting in the formaiton of by-products such as 4-cyanovaleric acid, 4 - cyanovaleramide, 1 - cyanocyclopentylideneimine and adipamide, as well as tars and elemental carbon. Obviously, such degradation not only reduces the yield of the desired product, but also results in an impure product which must be subjected to expensive purification procedures. Furthermore, as a result of the formation of degradation products, besetting problems of plugging of the catalyst bed and build-up deposits in the vaporization chamber and the various conduit lines in the system ensue. Investigations made in connection with the above discussed problems resulting from the formation of decomposition products have led to the discovery that a main factor in the degradation of adipic acid has been not only the length of time in which the adipic acid is maintained at elevated temperatures, but also the large surface area of the equipment with which the vaporous adipic acid comes into contact. An additional drawback of the prior art systems is that the equipment employed represents a considerable investment and is expensive to operate and to maintain.

The present invention in general includes a novel method and apparatus whereby molten adipic acid is atomized and vaporized in contact with superheated ammonia in an advantageous manner. In accordance with an additional and beneficial feature of the invention, the vaporization of the adipic acid may be carried out in the presence of superheated steam. Preferably the vaporization of adipic acid and contact thereof with ammonia, together with steam if desired, occur directly above the bed of catalyst employed to speed the reaction between the adipic acid and ammonia. By virtue of the apparatus of this invention a separate vaporization chamber and accompanying conduits from it to a catalytic chamber are eliminated. Furthermore, vaporization of adipic acid and conversion thereof to adiponitrile are conducted in a single unit comprised of contiguous vaporizer and converted sections. Not only does this represent a considerable economic saving in the cost of equipment construction, but also results in such rapid and efficacious vaporization and such reduced surface area contact of equipment and vaporous adipic acid so as to minimize greatly the formation of tars and other decomposition products resulting from the degradation of adipic acid. Moreover, by employing the process and apparatus of this invention, yields of adiponitrile with a higher degree of purity have been increased substantially over yields heretofore obtainable by using the methods and apparatus of the prior art.

It is, therefore, a primary object of this invention to provide a novel method and apparatus for improved manufacture of adiponitrile.

It is a further object of this invention to provide a novel method and apparatus wherein the vaporization of adipic acid and the reaction thereof with ammonia to form adiponitrile are conducted in a substantially unitary apparatus.

It is a further object of this invention to provide a novel method and apparatus for the preparation of adiponitrile from adipic acid and ammonia in high yields and with a minimum formation of degradation products.

Another object of this invention is to provide a novel method and apparatus for converting adipic acid vapor in the presence of ammonia and steam in a rapid, efficient, and economical manner.

Still another object of this invention is to provide a novel apparatus which includes a minimum surface area with which the vaporized adipic acid may come in contact.

Yet another object of this invention is to provide a novel method wherein the time between the point at which the adipic acid and ammonia initially contact each other and the point at which they contact the dehydrating catalyst is reduced to a minimum.

Other objects and advantages of the invention will become apparent from the following description thereof taken in connection with the accompanying drawing.

In accordance with the invention in its preferred embodiments the method includes establishing a flowing stream of molten adipic acid through a small opening and discharging same into an annular zone, preferably the zone assuming the form of a truncated cone. In a specific embodiment the discharge is made axially into said zone at a point near the smaller end thereof. A stream of superheated ammonia is established and is directed into said zone so that the ammonia moves concurrently and concentrically with respect to the stream of molten adipic acid. The resulting concentric streams of acid and ammonia are directed forthwith into an expansion zone to vaporize the adipic acid. The expansion zone preferably assumes the form of a second truncated cone, the cones being interconnected at their smaller ends by means of a cylindrically shaped connecting zone. The thus-expanded material is passed directly over a catalytic bed at an elevated temperature to convert the adipic acid into adiponitrile. Finally, the thus-produced adiponitrile is condensed and collected. In accordance with a preferred feature of the invention the stream of superheated ammonia enters the first annuar zone tangentially near the larger end thereof. Moreover, a stream of superheated steam may be flowed into the zone simultaneously with the superheated ammonia. In one aspect of the invention, a stream of superheated ammonia and a stream of superheated steam enter the first annular zone tangentially near the larger end thereof at points about 180° apart.

The novel features which are believed to be characteristic of the invention are set forth with particularity in the appended claims. The invention itself, however, both as to its organization and mode of operation, may be understood best by reference to the following description taken in conjunction with the accompanying drawing in which:

FIGURE 1 is a vertical view partly in section of the adipic acid converting apparatus of this invention with associated structure being shown schematically for purposes of illustration;

FIGURE 2 is a sectional view taken along line 2—2 of FIGURE 1 in the direction of the arrows.

Figure 3:
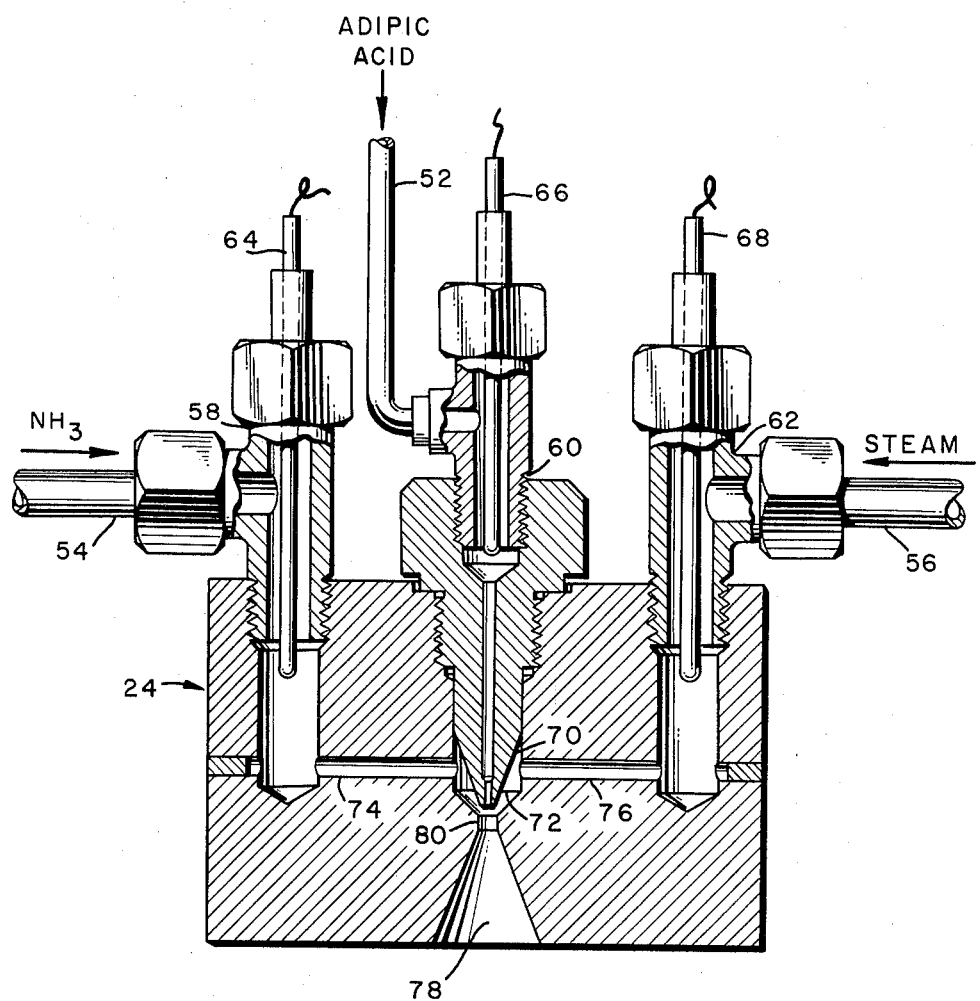
FIGURE 3 is an enlarged section view of the nozzle block shown schematically in FIGURE 1.

Referring now to FIGURE 1 of the drawing, there is shown a suitably supported chamber 10 which encloses four catalyst-containing tubular members 12. A catalytic material 13 is incorporated in these elongated tubes. The level to which the tubes are filled will depend on the size of the tubes, the flow rate of the reactants through the catalyst bed, etc. While one such tube may be employed, it is preferred to use a plurality of tubes. The tubular members 12 at their upper ends communicate with an upper compartment 14 defined by a wall 15. At their lower ends the tubular members 12 communicate with a lower compartment 16 defined by a wall 17. A suitable mesh screen 18 or like porous material supports the catalytic material 13 in the said tubular members.

Supported on the upper flange of wall 15 is a hollow vessel 20 shaped like a bell or an inverted flaring cup which defines an expansion chamber 22. It is to be noted that the expansion chamber is disposed above and adjacent to the four tubular members 12.

Mounted on the upper flange of vessel 20 is a nozzle block 24 which is shown schematically and will be described in more detail in the discussion of FIGURE 3 below. A heating shell 26 surrounds the nozzle block 24 and vessel 20 of the apparatus and preferably is adapted to be filled with a suitable heating medium such as "Dowtherm" vapors or the like. It is apparent that this heating shell also may take the form of other conventional heating means, the objective being to maintain the block 24 and vessel 20 at a suitably high temperature ordinarily sufficient to vaporize adipid acid in a rapid and efficient manner.

With reference to the disclosed means for transferring heat to the tubular members 12 and to the reaction mass moving in a gaseous phase therethrough and in contact with the catalytic material 13, there is shown a container 29 preferably encased in an insulating material 30 and adapted for holding a heating fluid 32 such as a liquid having a high boiling point. The heating fluid preferably fills the container to the level indicated and surrounds the tubular members 12 in heat exchange relationship therewith. A baffle plate 34 as disclosed suitably supported within the container 29 separates the area in which the tubular members are disposed from the pie-shaped area in which heat is supplied to the heating fluid. While heat may be supplied to the fluid in other conventional manners, it has been found convenient to do this by providing within the heating area heating means 36. The heating means preferably comprises an internal electrically energizable heater element, electrical power being supplied thereto through conductive lines 38 for receiving electric power. The heating means extends through the bottom of container 29 and upwardly into the heating fluid 32 in the pie-shaped area to maintain the same at a desired elevated temperature. To provide efficient circulation of the fluid a propeller blade type agitator 40 is fixedly mounted to a shaft 42 adapted to be rotated by a motor 44. The pitch of the blade of the agitator is such that the fluid moves downwardly through the heating area and upwardly through the area in which the tubular members 12 are located.

Connecting the lower compartment 16 with a condenser chamber is a conduit 46, in which chamber the reaction product moving from the lower compartment 16 is cooled so as to condense the adiponitrile produced. A product receiver is connected with line 48 for collecting the condensed material from which the material may be transmitted for further processing such as purification and/or hydrogenating procedures. The receiver may be equipped with an off gas conduit 50 for removal of ammonia and other waste gases.

Referring to the structure in FIGURE 1 for supplying the feed materials to the apparatus, there is shown schematically an adipic acid supply conduit 52 leading to a point near the center of nozzle block 24. This conduit, as well as other feed lines, may be surrounded by heating elements for insuring that the adipic acid entering the block is in a molten condition and is equipped with an insulation jacket. An ammonia supply conduit 54 extends through a superheater before connecting with the nozzle block 24 so that the ammonia is heated prior to its contact with adipic acid to a suitably high temperature. A steam supply conduit 56 extends through a superheater before connecting wtih the nozzle block 24 so that the steam is heated prior to its contact with adipic acid to a suitably high temperature.

The feed sources for the three components of reaction in the instant invention have not been disclosed in the drawing but comprise conventional feed means. For instance, a melt and feed tank for molten adipic acid may be provided; and a feed pump may be used to move the acid to the nozzle block 24. Ammonia can be fed to the superheater from a conventional high pressure cylinder.

With reference now to the particular structure of the nozzle block 24, attention is directed to FIGURE 3 of the drawing. In the embodiment shown three nozzles extend within the block 24, namely ammonia supply nozzle 58, adipic acid supply nozzle 60 and steam supply nozzle 62 fitted in threaded relation with the block 24. Reference numerals 64, 66, and 68 indicate thermocouples extending within the respective nozzles and which are operatively connected with a control means (not shown) for regulating the temperatures of the superheaters and adipic acid melt tank as desired in response to temperature variations in the nozzles.

Adipic acid supply nozzle 60 terminates in a taper nose 70 preferably of conical shape and extends into an annular zone 72 which assumes the form of a truncated cone. The tip of the nose 70 extends to a point near the smaller end of the frusto-conical annular zone. Communicating with the zone 72 are port means 74 and 76 for supplying superheated ammonia and superheated steam, respectively, to the said annular zone. In accordance with one embodiment of this invention the ports are located so as to provide a tangential entry of the ammonia and the steam into the zone 72. Connecting the smaller end of the zone 72 with a second frusto-conical annular zone 78 is a cylindrical portion 80. The zone 78 provides a convenient flaring exit so that the adipic acid and the attendant gases expand and flow into the expansion chamber 22.

In operation the tubular members 12 are filled with a dehydrating catalyst and the fluid surrounding the members is heated to adiponitrile forming temperatures. The block 24 and chamber 22 are heated to desired temperatures, so as to insure rapid vaporization of the adipic acid. Molten adipic acid is pumped to nozzle 60 and downwardly therethrough and is emitted from the nose of the nozzle into the annular zone 72 in the form of a fine liquid spray. At the same time, superheated ammonia is supplied to nozzle 58 and by way of port means 74 and enters the zone 72 at a point near the top thereof. As can be seen the ammonia will be directed in impinging relation against nose 70 downwardly in concentric and concurrent relation with the emitted stream of adipic acid. If the port means 74 is in a form of a tangential feed pipe, a rotary motion of the ammonia or a cyclonic current of ammonia is set up in the zone 72, providing a more intimate contact between the adipic acid and ammonia. Simultaneously, superheated steam may be supplied to nozzle 62 and by way of port means 76 enters the zone 72 at a point near the top thereof. The steam will be directed downwardly with the ammonia in concentric and concurrent relation with the emitted steam of adipic acid. Here again the port means 76 may take the form of a tangential feed pipe in which event a cyclonic current of ammonia-steam mixture is set up. In some cases it is preferred that the tangential entry of the ammonia be about 180° apart from the tangential entry of the steam. The resulting concentric streams are directed downwardly through a cylindrical portion or zone 80 interconnecting the first frusto-conical annular zone 72 with the second frusto-conical zone 78 at their smaller ends and thence through the said second zone to expand the stream and to induce vaporization of the adipic acid. Next, the thus-expanded material is flowed downwardly over a dehydrating catalyst contained in members 12 at an elevated temperature to convert the adipic acid and ammonia into high grade adiponitrile. The thus-produced adiponitrile is separated from the catalyst and condensed.

The dehydration catalysts which may be employed for the conversion of ammonia and adipic acid mixtures to adiponitrile are well known in the art and include for example the dehydrating oxides of aluminum, silicon, tungsten, titanium, molybdenum, and the like. A catalyst yielding excellent results is a sintered mixture of boric and phosphoric acid.

In the process of the present invention, there are believed to be a number of independent variables which are interrelated, and which for best results should be contained within specific limits in order to obtain optimum yield of adiponitrile with minimum formation of degradation products as well as extended catalyst life. These variables are:

(1) Ammonia:adipic acid ratio,
(2) Steam:adipic acid ratio,
(3) SVH,
(4) Ratio of vaporizer area to catalyst area,
(5) Converter temperature,
(6) Vaporizer temperature.

With regard to the ammonia:adipic acid ratio, it has been found that best results are achieved by employing a flow ratio between 0.65 and 1.5 on a weight basis with the preferred range being between 0.8 and 1.3. At ratios less than 0.65 it has been found that reaction rate slows down perceptively, while no advantage is served by employing ammonia in excess of 1.5.

The use of steam is not essential to the operation of the instant process; but it has been found that the use of steam notably decreases degradation of the process materials and increases catalyst life. However, adiponitrile yields have been found to decrease substantially as the steam:adipic acid ratio is raised much above 0.2 on a weight basis. Accordingly, the steam:adipic acid ratio should be maintained at about 0.2 or less.

Variable No. 3 above, i.e. SVH, also referred to as "space velocity," is the ratio of the total volume of reactants passing through the system calculated as being in vapor phase at 0° C. and 760 mm. Hg absolute pressure to the total apparent volume of the catalyst (i.e., the filled volume of the container in which the catalyst is contained). Two dependent variables not listed above which are directly related to any specific temperature and pressure to SVH (1) contact time of the reactants with the catalyst, and (2) retention time of the reactants within the vaporizer section of the apparatus. The value of SVH must be maintained sufficiently low so as to give good contact time with the catalyst and completeness of reaction, but on the other hand not so low as to result in a long retention time within the vaporizer section of the converter which might result in increased adipic acid degradation. Generally, satisfactory results have been obtained using the SVH values between 300 and 600. The preferred range is between 350 and 500. When employing these values, it has been found that retention time within the vaporizer section may be up to five seconds and more although highest yields are obtained with a retention time of less than one second. It is believed that the rapid flow of reactants with consequent short retention time within the vaporizing section as well as the low surface area of the vaporizer leads to considerably less degradation as compared to the degradation obtained by the use of the large volume vaporizer chambers previously employed.

With regard to variables Nos. 5 and 6, it has been found that the temperatures of the converter and the vaporizer sections are generally maintained within substantially the same ranges. Temperatures between 330° C. and 410° C. have been found to give the best results with the preferred temperature of the converter being maintained at about 370°–410° C. and the preferred temperature of the vaporizer section being held between 345° C. and 400° C.

The following examples are given for purposes of illustration and are not to be construed as being limited thereto. In these examples parts and percentages are given on a weight basis unless otherwise indicated.

*Example I*

Employing the apparatus illustrated in the drawing, the dehydrating catalyst temperature was brought to and maintained at 390° C., while the vaporizer section was maintained at 335° C. Molten adipic acid at 198±2° C. was fed through the nozzle head at a rate of 16.8 pounds per hour where it contacted superheated ammonia at a temperature of 450±2° C. being fed at a rate of 11.9 pounds per hour. No steam was fed to the process. The ammonia:adipic acid ratio was 0.71 and SVH was 420. The dehydrating catalyst was a sintered mixture of boric acid and phosphoric acid. The process was stopped just short of four hours when a total of 66.97 pounds of adipic acid had been fed to the converter. The crude product, which had been continuously condensed was frictionally distilled. The yield of adiponitrile was 93.20 percent of theoretical.

*Example II*

In this run, the catalyst and vaporizer temperatures were the same as in Example I. Superheated ammonia at 450±1° C. and molten adipic acid at 180±6° C. were fed to the reactor at 11.1 and 10.3 pounds per hour respectively until a total of 43.20 pounds of adipic acid had been supplied. The ammonia:adipic acid ratio was maintained at 1.08. SVH was 373. The same catalyst as in Example I was used. 40.28 pounds of adiponitrile was recovered for a yield of 93.24 percent of theoretical.

*Example III*

Superheated ammonia at 451±5° C. was fed at the rate of 12.2 pounds per hour to the nozzle block where it met oncoming streams of molten adipic acid at 216±6° C. fed at the rate of 10.1 pounds per hour and superheated steam at 470±8° C. fed at the rate of 2.0 pounds (water) per hour. A total of 39.37 pounds of adipic acid was reacted. The above quantities gave an ammonia:adipic acid ratio of 1.20 and a steam:adipic acid ratio of 0.19. SVH was 463, vaporizer temperature was 335° C. and the converter temperature was maintained at 390° C. The same catalyst as above in Example I was used. A 94.85 percent of theoretical yield of adiponitrile was obtained.

The following examples are presented to demonstrate that the high adiponitrile yields in the preceding three examples were made possible by the compact vaporizer described in this invention, and that the high yields are unattainable with vaporizing apparatus having substantially greater volume and surface area. The two vaporizing apparatus evaluated in the following examples employed similar spray feeding of the reactant streams. A smaller converter used with these vaporizers is reflected in the correspondingly lower feed rates.

*Example IV*

Employing a vaporizing apparatus with 2.5 times the volume and 4.2 times the surface area of the apparatus described in this invention, the temperature of the converter was brought to and maintained at 390° C., while the vaporizer section was maintained at 330° C. Molten adipic acid and superheated steam were fed through the nozzle head at 3.08 and 2.28 pounds per hour, respectively. No steam was fed to the system. The ammonia: adipic acid ratio was 0.74, and the SVH was 426. The standard boric-phosphoric acid mixture catalyst was used in the converter. A total of 12.2 pounds of adipic acid were fed to the reaction, and a yield of only 69.7 percent of theoretical was obtained.

*Example V*

The vaporizer apparatus, catalyst, vaporizer and converter temperatures were the same as in Example IV. Superheated ammonia was fed to the reaction at 2.56 pounds per hour, and molten adipic acid at 2.02 pounds per hour until 8.06 pounds adipic acid had been fed. The ammonia:adipic acid ratio was 1.26 and the SVH was 450. No steam was added to the reaction. A total of 5.09 pounds of adiponitrile was recovered from the reaction for a yield of 85.4 percent of theoretical.

*Example VI*

The same vaporizer apparatus, catalyst, vaporizer and converter temperatures given in Example IV were employed in this example. Superheated ammonia and molten adipic acid were fed at 3.35 and 2.87 pounds per hour respectively, without steam addition. The ammonia:adipic acid ratio was 1.13 and the SVH was 446. A yield of 80.4 percent of theoretical was obtained by recovering 6.83 pounds of adiponitrile from the 11.48 pounds of adipic acid fed to the reaction.

*Example VII*

A large vaporizer with 178 times the volume and 43.6 times the surface area of the vaporizing apparatus described in this invention was employed and the temperatures of the converter and vaporizer were each maintained at 350° C. Superheated ammonia at 450° C. was fed at 2.46 pounds per hour; superheated steam at 550° C. was fed at 2.27 pounds per hour; and molten adipic acid at 276° C. was fed at 2.54 pounds per hour. The standard boric-phosphoric acid catalyst mixture was used in the converter. The SVH was 790. 4.84 pounds of adiponitrile was recovered from 10.18 pounds of adipic acid fed to the reaction, for a yield of 64.2 percent of theoretical.

*Example VIII*

The same vaporizer apparatus, catalyst, vaporizer and converter temperature given in Example VII were used in this example. Superheated ammonia at 455° C. and molten adipic acid at 250° C. were fed to the vaporizer at 3.08 and 1.14 pounds per hour respectively. No steam was fed. The ammonia:adipic acid ratio was 2.7, and the SVH was 518. 9.12 pounds of adipic acid was fed, and 4.17 pounds of adiponitrile was recovered, for a yield of 61.8 percent of theoretical.

*Example IX*

The temperature of the vaporizer used in Example VII was maintained at 330° C. The converter with the standard catalyst type was maintained at 350° C. Superheated ammonia at 450° C. was fed at 3.39 pounds per hour, and molten adipic acid at 225° C. was fed at 1.42 pounds per hour, providing an ammonia:adipic acid ratio of 2.39, and an SVH of 573. There was no steam addition. A yield of 58.3 percent of theoretical was obtained by recovering 4.89 pounds of adiponitrile from 11.34 pounds of adipic acid fed to the reaction.

In the above Examples I–III yields of adiponitrile are shown to be substantially higher than generally heretofore attainable. The loss of yield was found to be attributable primarily to (1) mechanical loss of product in transfer and distillation operations, (2) scale errors, and (3) leakage of adipic acid from the system prior to reaction. Only a minor portion of the yield loss was due to decompositon of adipic acid or to reaction products leaving tar deposits on the catalyst or in other parts of the system. Moreover, catalyst life was quite prolonged.

In Examples IV–IX, the yield loss was primarily due to decomposition of reactants in the vaporizer section. Tars were formed which deposited on the catalyst and substantially reduced the effective life of the catalyst.

As many different embodiments of this invention may be made without departing from the spirit and scope thereof, it is to be understood that the invention is not limited to the specific embodiments disclosed herein except as defined in the following claims.

What is claimed is:

1. Apparatus for vaporization of adipic acid and reaction thereof with ammonia to form adiponitrile comprising a block member having a hole therethrough, a nozzle head fitted in said hole and having a tapered nose portion terminating within said hole so as to define with the said hole an annular space, means defining a port through wihch ammonia normally flows and extending from the annular space normally with respect to the axis of said hole in fluid impinging relationship with the tapered nose of said nozzle head, means defining an axial jet passage formed through said nozzle head in alignment with said hole and through which molten adipic acid normally moves, means contiguous with and positioned below said block member defining an expansion chamber to receive and to facilitate the vaporization of the molten adipic acid emitted from the jet passage of said nozzle head, means for heating said block member and said means defining said chamber, at least one elongated member below said chamber for containing a dehydration catalyst through which the vaporized adipic acid and ammonia downwardly pass and react to form adiponitrile, means for heating said elongated members, and means to condense the thus-formed adiponitrile.

2. Apparatus for vaporization of adipic acid and reaction thereof with ammonia to form adiponitrile comprising a block having a bore therethrough, a nozzle head fitted in the top part of said bore and having a conical nose portion terminating within said bore so as to define with the said bore an annular space, means defining a port through which ammonia normally flows and extending from the annular space normally with respect to the axis of said hole in fluid impinging relationship with the conical nose of said nozzle head, means defining an axial jet passage formed through said nozzle head in axial alignment with said bore and through which molten adipic acid normally moves, means contiguous with and positioned below said block member defining an expansion chamber to receive and to facilitate the vaporization of the molten adipic acid emitted from the jet passage of said nozzle head, means for heating said block and said means defining said chamber, a plurality of elongated tubular members positioned below the said chamber in closely spaced relation therewith for containing a dehydration catalyst through which the vaporized adipic acid and ammonia downwardly pass and react to form adiponitrile, means for heating said tubular members, and means to condense the thus-formed adiponitrile.

3. Apparatus for vaporization of adipic acid and reaction thereof with ammonia to form adiponitrile comprising a block having a bore therethrough, said bore including two conical portions with opposite flaring ends, a nozzle head fitted in the top part of said bore and having a conical nose portion terminating within the upper conical portion of said bore so as to define with the said bore an annular space, means defining a plurality of ammonia entry ports and extending from the annular space normally with respect to the axis of said hole in fluid impinging relationship with the conical nose of said nozzle head, means defining an axial jet passage formed through said nozzle head in axial alignment with said bore and through which molten adipic acid normally moves, means contiguous with and positioned below said block defining an expansion chamber to receive and to facilitate the vaporization of the molten adipic acid emitted from the jet passage of said nozzle head, means for heating said block and said means defining said chamber, a plurality of elongated spaced apart tubular members positioned below the said chamber in closely spaced relation therewith for containing a dehydration catalyst through which the vaporized adipic acid and ammonia downwardly pass and react to form adiponitrile, means for heating said tubular members, and means to condense the thus-formed adiponitrile.

4. Apparatus for vaporization of adipic acid and reaction thereof with ammonia to form adiponitrile comprising a block having a bore therethrough, said bore including two truncated conical portions connected at the small ends thereof by a short cylindrical portion, a nozzle head fitted in the top part of said bore and having a conical nose portion terminating within the upper conical portion of said bore and adjacent to the small end of the upper conical portion so as to define with the said bore an annular space, means defining a plurality of ammonia entry ports and extending from the annular space normally with respect to the axis of said bore in fluid impinging relationship with the conical nose of said nozzle head, means defining an axial jet passage formed through said nozzle head in axial alignment with said bore and through which molten adipic acid normally moves, means contiguous with and positioned below the said block defining an expansion chamber to receive and to facilitate the vaporization of the molten adipic acid emitted from the jet passage of said nozzle head, means for heating said block and said means defining said chamber, a plurality of elongated spaced apart tubular members positioned below the said chamber in closely spaced relation therewith for containing a dehydration catalyst through which the vaporized adipic acid and ammonia downwardly pass and react to form adiponitrile, means for heating the said tubular members, and means to condense the thus-formed adiponitrile.

5. The apparatus of claim 4 wherein the means for heating the tubular members includes means for flowing a hot liquid around the outside of the tubular members in heat exchange relation therewith.

6. Apparatus for vaporization of adipic acid and reaction thereof with ammonia to form adiponitrile comprising a block having a bore therethrough, said bore including two truncated conical portions connected at the small ends thereof by a short cylindrical portion, a nozzle head fitted in the top part of said bore and having a conical nose portion terminating within the upper conical portion of said bore and adjacent to the small end of the upper conical portion so as to define with the said bore an annular space, means defining a plurality of ammonia entry ports and extending tangentially from the annular space and normally with respect to the axis of said bore in fluid impinging relationship with the conical nose of said nozzle head, the said ports communicating with the said annular space at points near the large end of the upper conical portion of said bore, means defining an axial jet passage formed through the said nozzle head in axial alignment with the said bore and through which molten adipic acid normally moves, means contiguous with and positioned below the said block defining an expansion chamber to receive and to facilitate the vaporization of the molten adipic acid emitted from the jet passage of said nozzle head, means for heating said block and said means defining said chamber, a plurality of elongated spaced apart tubular members positioned below the said chamber in closely spaced relation therewith for containing a dehydration catalyst through which the vaporized adipic acid and ammonia downwardly pass and react to form adiponitrile, means for heating the said tubular members, and means to condense the thus-formed adiponitrile.

7. The apparatus of claim 6 wherein the means for heating the tubular members includes means for flowing a hot liquid around the outside of the tubular members in heat exchange relation therewith.

8. The apparatus of claim 7 which includes means to heat normally solid adipic acid to a molten condition prior to the movement of the adipic acid through the jet passage.

9. Apparatus for vaporization of adipic acid and reaction thereof with ammonia to form adiponitrile comprising a block having a bore therethrough, said bore including two truncated conical portions connected at the small ends thereof by a short cylindrical portion, a nozzle head fitted in the top part of said bore and having a conical nose portion terminating within the upper conical portion of said bore and adjacent to the small end of the upper conical portion so as to define with the said bore an annular space, means defining a first port through which ammonia normally flows and extending tangentially from the annular space and normally with respect to the axis of said bore in fluid impinging relationship with the conical nose of said nozzle head, a second port through which steam normally flows and extending tangentially from the annular space and normally with respect to the axis of said bore in fluid impinging relationship with the conical nose of said nozzle head, the said ports communicating with the said annular space at points near the large end of the upper conical portion of said bore and at points approximately 180° apart with respect to each other, means defining an axial jet passage formed through the said nozzle head in axial alignment with the said bore and through which molten adipic acid normally moves, means contiguous with and positioned below the said block defining an expansion chamber to receive and to facilitate the vaporization of the molten adipic acid emitted from the jet passage of said nozzle head, means for heating said block and said means defining said chamber, a plurality of elongated spaced apart tubular members positioned below the said chamber in closely spaced relation therewith for containing a dehydration catalyst through which the vaporized adipic acid and ammonia downwardly pass and react to form adiponitrile, means for heating the said tubular members, and means to condense the thus-formed adiponitrile.

10. The apparatus of claim 9 wherein the means for heating the tubular members includes means for flowing a hot liquid around the outside of the tubular members in heat exchange relation therewith.

11. The apparatus of claim 10 which includes means to heat normally solid adipic acid to a molten condition prior to the movement of the adipic acid through the jet passage.

References Cited by the Examiner

UNITED STATES PATENTS 2,064,468    12/1936    Foster _____ 23—288.92 X

FOREIGN PATENTS 221,956    9/1924    Great Britain.

MORRIS O. WOLK, *Primary Examiner.*

JAMES H. TAYMAN, JR., *Examiner.*